No. 659,241. Patented Oct. 9, 1900.
S. M. LILLIE.
METHOD OF DEFECATING SUGAR SOLUTIONS.
(Application filed Oct. 21, 1899.)
(No Model.)
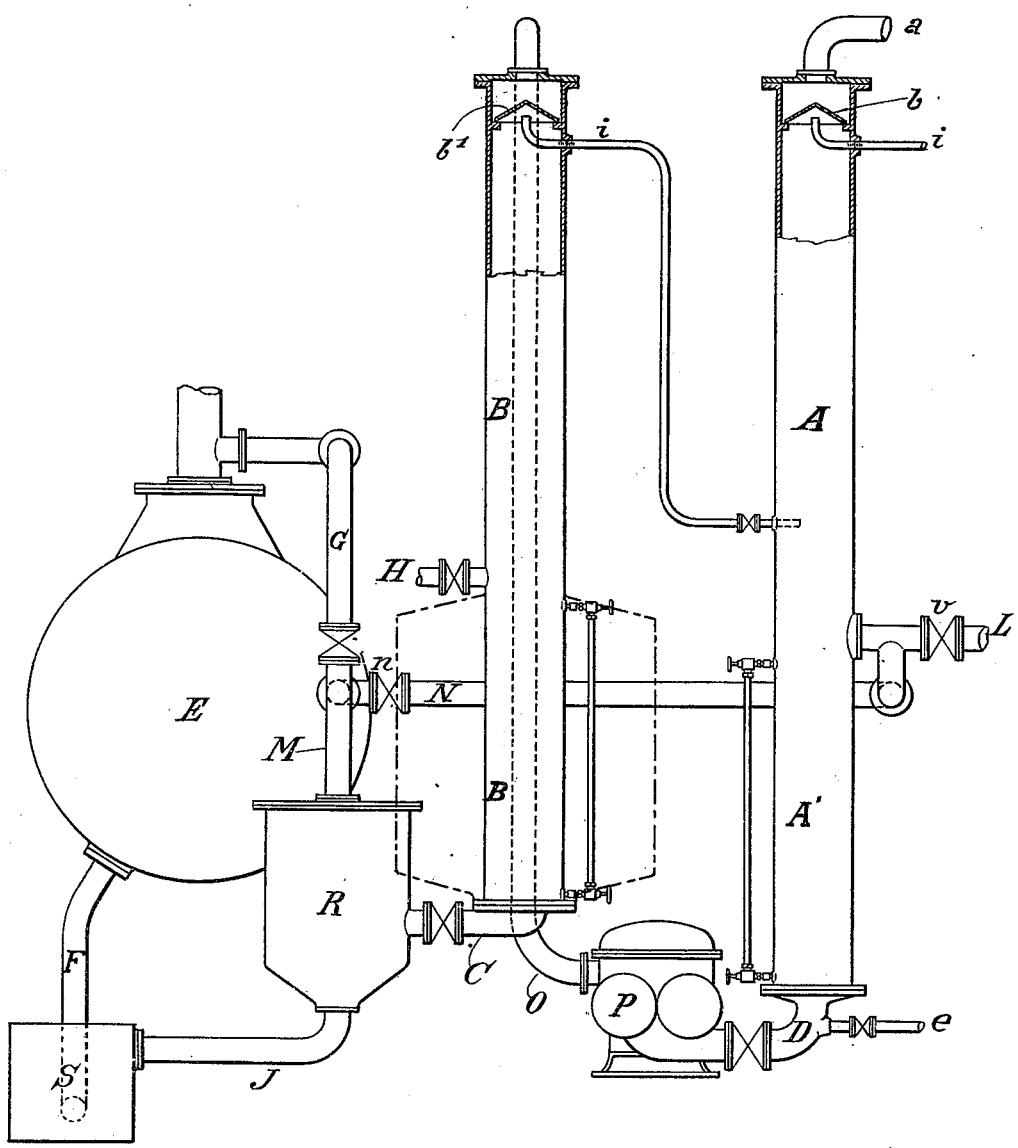
WITNESSES:
INVENTOR

UNITED STATES PATENT OFFICE.

SAMUEL MORRIS LILLIE, OF PHILADELPHIA, PENNSYLVANIA.

METHOD OF DEFECATING SUGAR SOLUTIONS.

SPECIFICATION forming part of Letters Patent No. 659,241, dated October 9, 1900.

Application filed October 21, 1899. Serial No. 734,414. (No specimens.)

*To all whom it may concern:*

Be it known that I, SAMUEL MORRIS LILLIE, of Philadelphia, county of Philadelphia, and State of Pennsylvania, have invented a new and useful method for defecating sugar solutions, such as raw-sugar-cane juices, by heating the same to high temperatures, in connection with suitable reagents, if needed, and for using the heat imparted to the sugar solutions for other useful heating purposes, of which the following is a specification, in which reference is had to the accompanying drawing.

The process consists, first, in heating the sugar solutions charged with the defecating reagent or reagents, if used—such as lime (CaO,) sulphurous acid, carbonic acid, phosphoric acid, &c.—to high temperatures and under pressure, temperatures preferably above 212°, and pressures above atmospheric; second, in releasing the pressure on the superheated solution to permit the disengagement of vapor or steam from the same, resulting in cooling and partially concentrating the solution, and, third, in using the disengaged vapor or steam for some useful heating purpose, such as for the heating of the sugar solution preliminary to superheating it or for evaporating effects in evaporating apparatus. In the latter case the heating produces evaporation, not elevation of temperature, and the heat transmitted disappears as latent heat in the resulting vapor.

In the drawing is shown apparatus for practicing this process in a continuous manner.

The apparatus shown consists of, first, spray or jet condenser A, into which the sugar solution charged with the defecating agent or reagents enters by a pipe $a$ and is brought into contact with low-pressure steam or vapor, condensing the same, and itself being heated thereby. It consists, second, of a second spray or jet condenser B, with means for delivering the partially-heated juice from the first condenser A into it, and in which condenser B it is brought into direct contact with high-pressure steam, which it condenses, and is heated thereby to such high temperatures as may be desired up to approximately the temperature of the steam. It consists, third, of a pressure and temperature reducing closed tank R, into which the superheated solution is drawn from the second condenser or heater B and in which a portion of the water of the solution flashes into steam, with a consequent cooling and partial concentration of the superheated solution. The tank R is provided with a vapor-escape pipe which conducts the produced vapor or steam to the apparatus in which it is used, and also with a pipe for conducting away the cooled solution to apparatus for freeing it of the matters precipitated in it by the heating.

In the particular construction shown in the drawing the first condenser or first heater consists of a closed vertical cylinder provided with a solution-inlet pipe $a$, opening through its top plate. Inside the cylinder, immediately below the solution-inlet, is a spraying device $b$, shown as a cone, apex up, which divides the entering stream of juice and delivers it onto the walls of the cylinder, down which it runs to the bottom of the same in thin layers. Immediately below the cone and with its mouth protected by the same from the sugar solution is an air-vent pipe $i$, which may lead preferably to some apparatus in which any vapors which might pass away through it might be used for heating purposes. Part way down the cylinder there opens into it a pipe L for bringing to it low-pressure steam, which will usually be exhaust-steam from engines and pumps. This pipe is provided with a suitable valve $v$, and between the valve and the cylinder it has a branch pipe N, having valve $n$ and communicating with the vapor-outlet M of the pressure-reducing tank R, through which branch vapor from the reducing-tank may be taken into the cylinder, as hereinafter set forth. Extending from the bottom of the cylinder some distance upward is a gage-glass for indicating the height of liquid in the cylinder. From the bottom of the low-pressure heater A a discharge-pipe provided with a hand-valve leads to the suction of pump P, whose discharge delivers by the connecting-pipe O into the top of second or high pressure heater B, whose construction, as shown, is the same as that of heater A and as above described. It is supplied with high-pressure steam through the pipe H, fitted with a valve. This valve and that on the low-pressure steam-pipe leading to the heater A may be hand-valves, or they may be automatic pressure-regulating valves, by which the pressure of steam, respectively, in the two heaters (and consequently the temperatures also) may be maintained automatically at anything desired up to those of high pressure and low pressure steam. The air-vent pipe $i$ of heater B delivers into the low-pressure heater A From the bottom of the high-pressure heater B a discharge-pipe C, fitted with a valve, leads into a closed pressure-reducing tank R, having a vapor-outlet main M at the top provided with two valved branches N and G, leading, respectively, to the low-pressure heater A and an evaporator E, and at the bottom the tank R has the juice-discharge pipe J, also fitted with a valve, which pipe leads to apparatus S of any suitable construction for separating the juice from matters suspended in it.

The mode of operation of this apparatus in practicing my invention consists in leading the sugar solution continuously into the low-pressure heater by the pipe and supplying low-pressure steam to the heater either from the low-pressure pipe L or from the reducing-pressure tank R by the pipe N, or from both sources, by which steam the juice while flowing down the walls of the heater is heated to a degree depending upon the pressure of steam maintained in the heater. Any air or gases which enter the heater A escape from the same by the vent-pipe $i$. From the bottom of the low-pressure heater A the partially-heated juice is taken and delivered (by the pump P) continuously through the pipe O into the top of the high-pressure heater B, down whose walls it flows, and is heated by high-pressure steam entering through the pipe H to a temperature depending upon the pressure maintained in the heater, which is governed by the valve in the pipe. From the bottom of the heater B the juice is allowed to flow continuously, as controlled by the valve, into the pressure-reducing tank R, the valve being regulated so that the juice in heater B stands sufficiently high above the outlet so that no steam, as such, passes into the tank R, but only the superheated solution. The pressure in the tank R will depend upon the pressure in the apparatuses in which the steam from the tank is employed and upon the regulation effected by the valves in the pipes which conduct this steam to the said apparatuses. In the drawing connecting-mains are shown leading to the low-pressure heater A and to an evaporator E as examples of the uses to which this steam may be put; but it may be used in any apparatus and for any purpose to which it may be suited. The superheated juice on entering the reducing-tank R immediately loses a portion of its water, which flashes into steam, owing to the reduced pressure, and the temperature of the juice is simultaneously lowered to a temperature corresponding to the reduced pressure.

The steam rises to the top of the tank and is taken away through the connecting-mains and used for heating purposes, as indicated. The cooled and partially-concentrated solution falls to the bottom of the tank and is conducted away by the pipe J to apparatus S, by which the precipitate or coagulum found in the juice by the heating of the same or by the reagents used is separated from the juice, and the latter is left in a clear state, free from suspended impurities and from many impurities which were in solution while in its native condition, but which were precipitated or coagulated in it by the heating and reagents to which it had been subjected. From S the solution may pass by proper conduits, say F, into the evaporator E and be evaporated in it in part by steam from the reducing-tank R. The reagents, if used, may be added to the juice before it is subjected to the heating in the low-pressure heater A or between the two heaters, as through the pipe $e$, leading into the pipe leading from the bottom of the heater A to the pump P, as may be preferred. Time is a factor in chemical reaction, and by carrying the level of the liquid in the two heaters at varying heights, as shown in the gage-glasses respectively attached to them, the times during which the juice shall be subjected to the temperature in either heater may be varied. To permit of this time being made to be of considerable duration when the condition of the juice renders it desirable, the lower portions A' and B' of the heaters may be made of greater diameters than the upper portions, as indicated by broken lines in the case of heater B, in which case the lower portion A' or B' of the heater, in fact, becomes a storage-tank, with the heater or condenser above it and communicating with it. By carrying the juice-level in this tank portion A' or B' at higher or lower levels the juice is subjected for a longer or shorter period to the temperature imparted to it in the heater.

As regards the above-described method of utilizing the heat contained in heated sugar solutions consisting in reducing the pressure of such solutions and in employing the resulting vapors for heating effects, it is immaterial what was the character of the apparatus by means of which the heat was imparted to the sugar solutions—whether, for example, by spray or by surface heaters. In any case the heat is abstracted from the solution by reducing the pressure on the latter and is made use of by employing the resulting vapors for heating purposes.

I have shown one form of heater in which the solution is heated by direct contact with the heating-steam; but I do not limit my construction to the particular one shown. Many other conceivable constructions for heating with steam by direct contact with the solutions would be adapted to my purpose.

It may be desirable in certain cases to subdivide the total heating into three or even more portions instead of into two, as herein described, in which case the number of heaters would be increased in number to three or more, using steam at increasing degrees of pressure in the respective heaters, commencing with the first heater—for example, exhaust under, say, fifteen seconds vacuum coming from high-duty engines might be employed in the first or lower-pressure heater. If surface heaters be used, hot gases or hot liquids may be employed for heating purposes to any extent found desirable.

I do not limit myself to any particular form of construction of the pressure-reducing tank, either external or internal.

I claim as my invention—

1. The within-described process of using heat for defecating sugar solutions and subsequently in other processes, consisting, first, in heating the sugar solutions under pressure in closed vessels, second, in reducing the pressure upon the heated solution to develop steam from the same, and third, in collecting the steam thus developed and employing it for heating purposes, substantially as described.

2. The within-described process of using heat for defecating sugar solutions and subsequently in other processes, consisting, first, in heating the solution under pressure in closed vessels, second, in reducing the pressure upon the heated solution to develop steam from the same, and third, in collecting the steam thus developed and employing it in preliminary heating of the said sugar solution, substantially as described.

3. The within-described process of defecating and evaporating sugar solutions, consisting, first, in heating the solutions to high temperatures in suitable heating apparatus by direct contact with live steam; and second in reducing the pressure on the heated solution to develop steam from the same and partially concentrate it thereby, and remove water of condensation added to the solution during heating, substantially as specified.

4. The within-described process of heating sugar solutions, charged with defecating reagents, by steam of different pressures and corresponding temperatures, consisting in forcing the solution through a series of vessels in succession, in number equal to the number of steam-pressures to be used in heating it, and in subjecting it in the several vessels respectively to the direct contact of the steam under the several pressures in the order of their increasing pressures, substantially as described.

S. MORRIS LILLIE.

Witnesses:
LEWIS C. LILLIE,
ANNA S. ELLS.